UNITED STATES PATENT OFFICE.

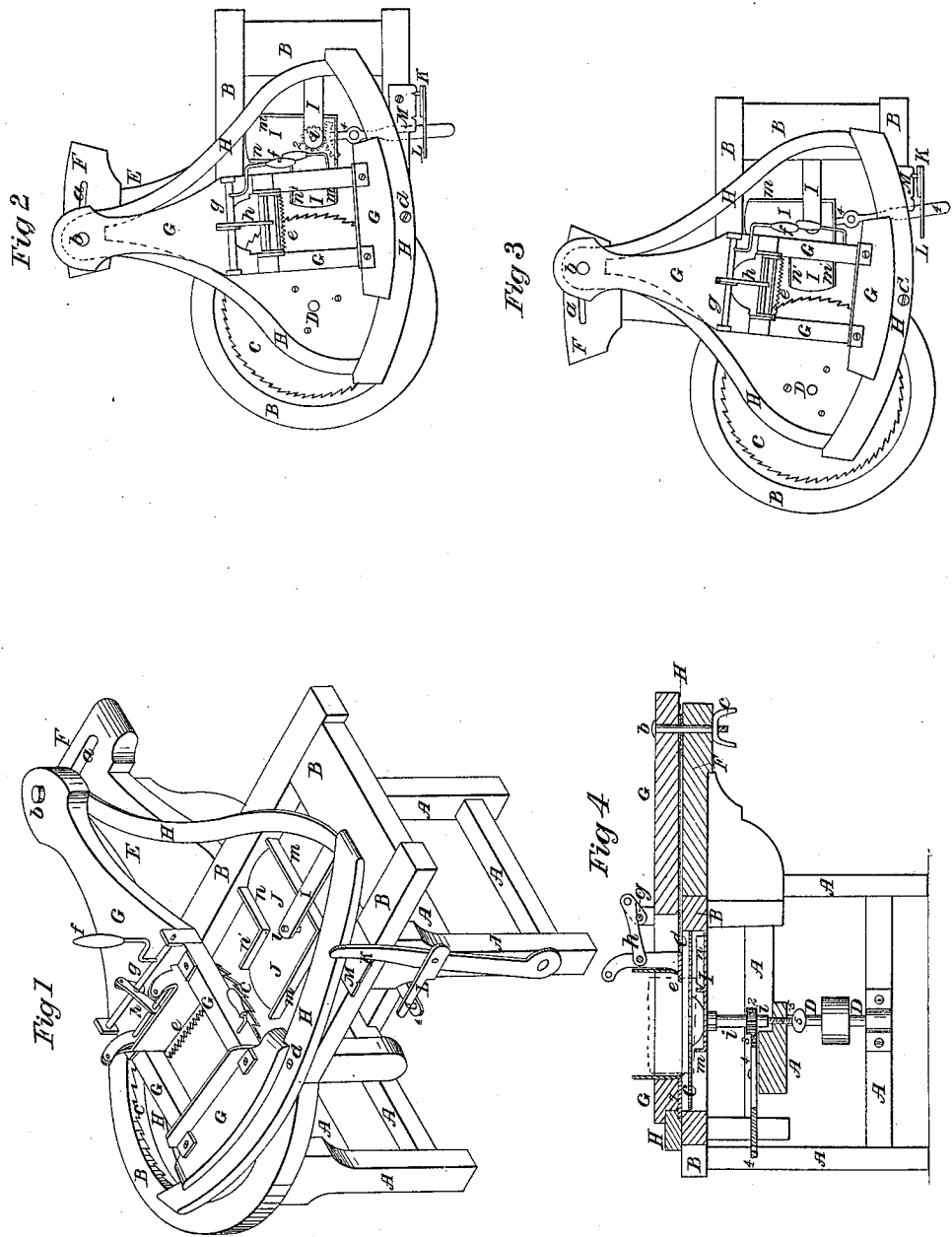

ELIJAH MORGAN, OF MORGANTOWN, VIRGINIA.

SHINGLE-MACHINE.

Specification of Letters Patent No. 19,199, dated January 26, 1858.

*To all whom it may concern:*

Be it known that I, ELIJAH MORGAN, of Morgantown, in the county of Monongalia and State of Virginia, have invented certain new and useful Improvements in Shingle-Machines; and I do hereby declare the following to be a full, clear, and exact description of the construction and operation of the same, reference being had to the accompanying drawings, making a part of this description, in which—

Figure 1 represents a perspective view of the machine. Figs. 2 and 3, represent top plans, wherein the auxiliary carriages in both, are represented at the extremes of their adjustment to show the different angles at which the bolt, from which the shingles are to be cut, may be brought up to the points of the teeth of the saw. Fig. 4, represents a vertical longitudinal section through the machine.

Similar letters of reference where they occur in the separate figures, denote like parts of the machine in all of them.

My invention relates, first, to the particular device for receiving and holding the bolt, to give it the proper inclination for defining the taper of the shingle; and also, to the auxiliary adjustable carriage, which regulates the angle at which the bolt is brought up to the saw.

To enable others skilled in the art to make and use my invention, I will proceed to describe the same with reference to the drawings.

A, represents a frame which supports a table B. A circular saw C, arranged on top of a vertical shaft D, is also supported in the frame A, said saw running in the plane of the top of the table, or slightly below it. On one side of the table B, there is a projection E, having a cross-head F upon it, and through this cross head there is cut a segmental slot *a*, through which passes a screw bolt *b*, having a thumb-screw *c* upon its lower end, that makes the center around which the carriage G, (that carries the bolt to the saw C, and then back to the bed where it is readjusted for the next operation), traverses.

Underneath the carriage G, there is an adjustable auxiliary carriage H, which is pivoted to the table B, at the point *d;* and the arms of this carriage where they unite (as seen in Figs. 2, 3,) have a hole through them, through which the screw bolt *b* also passes. The arc of the carriage H, forms a way, or guide for the carriage G, to move on. The same pin *b*, by this arrangement, is the center, around which the carriage G, moves, and the guide or regulator by which the auxiliary carriage H, is adjusted in the slot *a*. The object, of the second carriage H, and its adjustment, is that, the inclination of the bolt, may be varied with regard to the teeth of the saw, as the nature of the wood being worked, or the condition of the saw may require. When the two carriages are adjusted in the slot *a*, as seen in Fig. 2, the bolt is fed up in nearly a perpendicular line to the points of the teeth. But when they are adjusted as seen in Fig. 3, then the bolt approaches more nearly in a line with the point or shoulder of the teeth, the intermediate adjustments between the extremes of course graduating the position of the bolt; and thus if the wood be hard or soft, or the saw more or less dull, the proper pitch of the teeth of the saw to meet these circumstances may be made available by changing the horizontal position of the bolt, to bring it more or less against the points of the teeth of the saw, and thus causing them to take more of less into the wood.

The bolt is dogged to the carriage G, by a swinging dog *e*, which is thrown into, and drawn out of it, by a lever *f*, connected to the rock shaft *g*, to which also the dog is connected by the bar *h*.

On the top of a vertical shaft *i*, the lower end of which is supported in the frame A, and the upper end thereof in an arm I, projecting from the table B, there is arranged an L shaped piece J, having flanges *m, m*, and *n, n*, turned up on its sides, the former of which (*m*), are higher than the others *n*, so that the difference between their height shall correspond to, or represent the difference in thickness between the point and butt, of the shingles. There is a long pinion 2, on the shaft *i*, into which a set of segmental teeth 3, on the end of a pivoted lever 4 take, so as to turn the shaft, and the piece I upon it. The lower end of the shaft *i*, has heretofore been said to be supported in the frame A. It is so supported, but not directly, inasmuch as the screw 5 which passes through the frame receives its lower end, and by means of this screw, the shaft *i*, with its top piece I can be raised or lowered at pleasure, to give the proper thickness to the shingle, the long pinion 2 admitting of this raising and lowering, and continuing in gear with the segments 3, as it slides up and down.

A hand lever K, is pivoted to the frame, and to this lever, is pivoted an arm L, which has a tooth 6 upon it that drops into a hole in the end of the lever 4, which has upon its other end the segmental teeth 3, so that by connecting the arm L, to the lever 4, and vibrating the lever K, the piece I, is caused to make a quarter of a revolution bringing alternately the flanges $m$, $n$, and $m'$, $n'$, alternately underneath the path of the carriage G, and in proper position to receive the bolt of wood when it is dropped from said carriage, and hold it in proper position to be re-dogged and reverse the ends from which the points of the shingle are to be cut.

The carriage G, has a stop 7, Fig. 4 upon it, which strikes against shoulders on the underside of the carriage H, and thus limits the extent of its motion. The piece I, has shoulders upon its flanges $m'$, $n'$, $m$, $n$, which coming against the arm I, regulates the extent of its motion; and the lever K, has a tooth upon it which takes into one of the notches in the plate M, and regulates the extent of its vibration. And these stops may all be made adjustable so as to vary them to suit the circumstances of the case.

Having thus fully described the nature and object of my invention, what I claim therein as new and desire to secure by Letters Patent is,

1. In combination with the traversing carriage G, the horizontally semi-rotating piece I, with its flanges $m$, $m$, and $m'$, $n'$, operated in the manner and for the purpose set forth.

2. I also claim in combination with the carriage G, the auxiliary carriage H, when made susceptible of adjustment, as herein set forth, for the purpose of changing the line or angle at which the bolt is brought against the saw, as described.

ELIJAH MORGAN.

Witnesses:
A. E. THORN,
N. BENKSHINE.